Inventors
W. J. FEDORCHAK
V. J. POLITSCH
L. H. WIDEMAN
D. M. DUNCAN

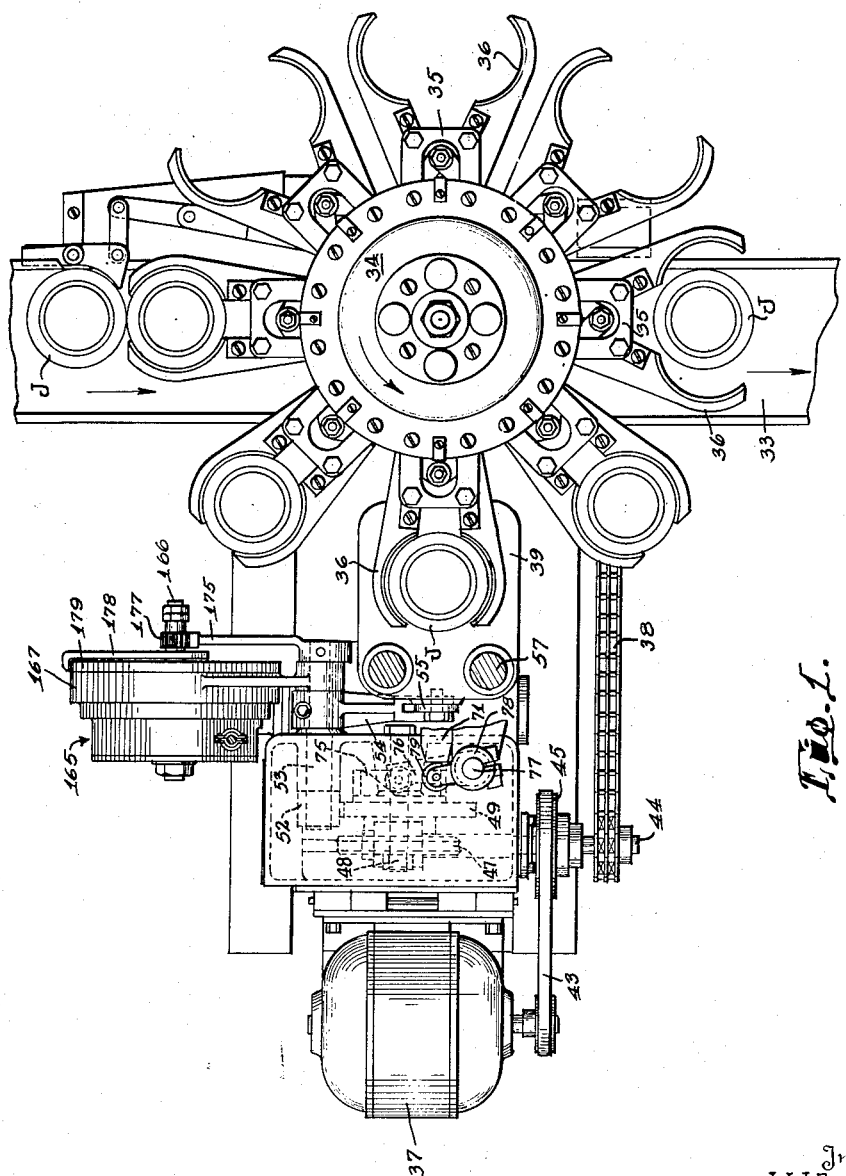

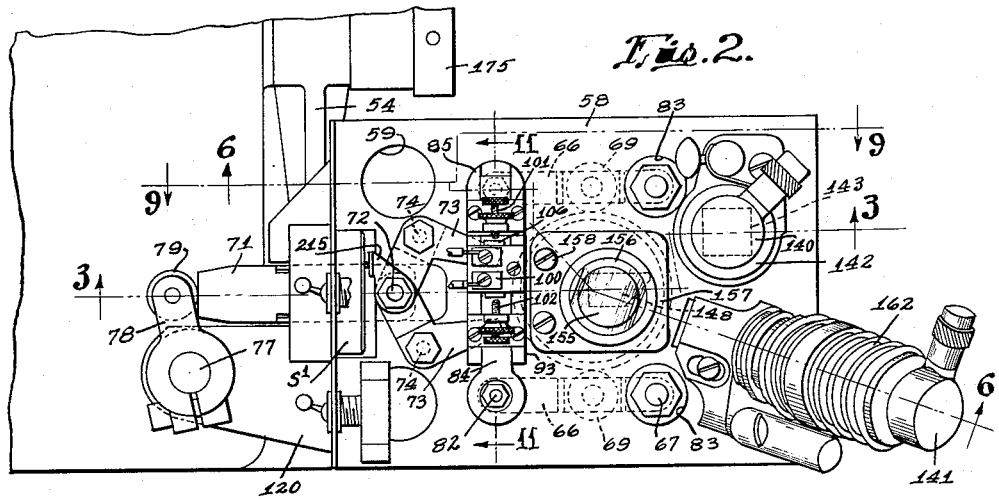
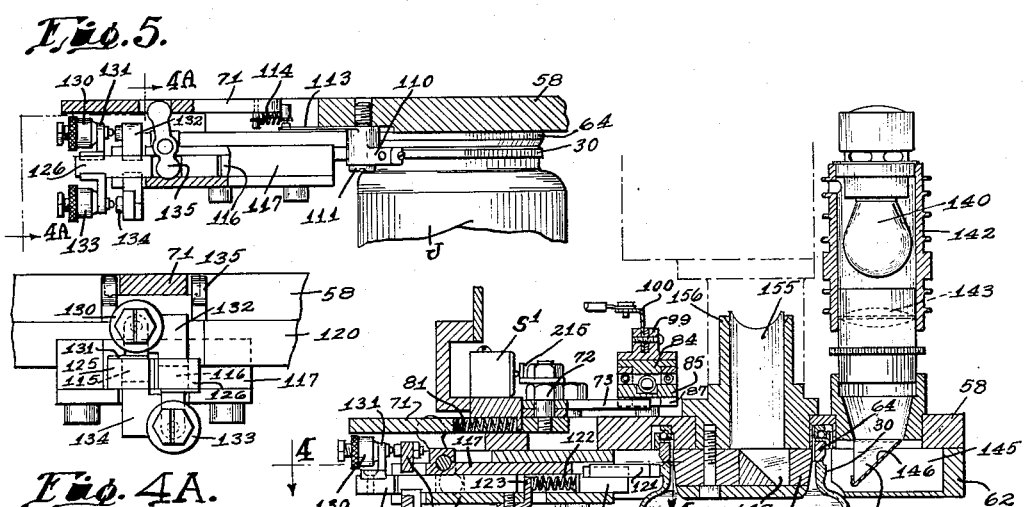
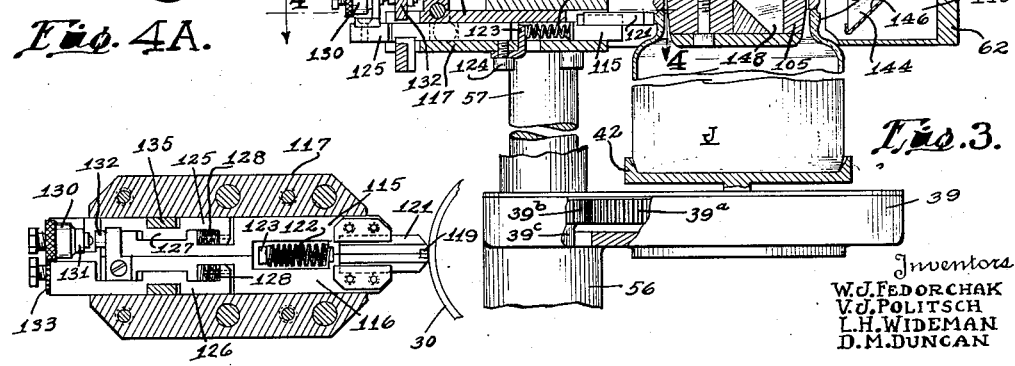

By Rule and Hoge,
Attorneys

July 6, 1954     W. J. FEDORCHAK ET AL     2,682,802
GAUGING AND DETECTING APPARATUS
Filed Aug. 23, 1946     7 Sheets-Sheet 4
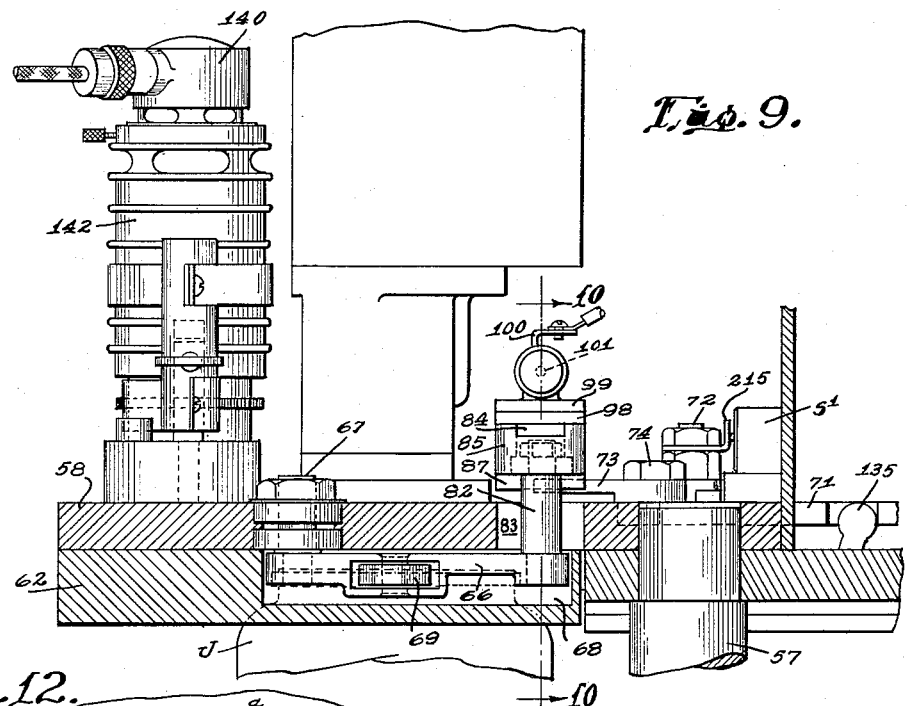
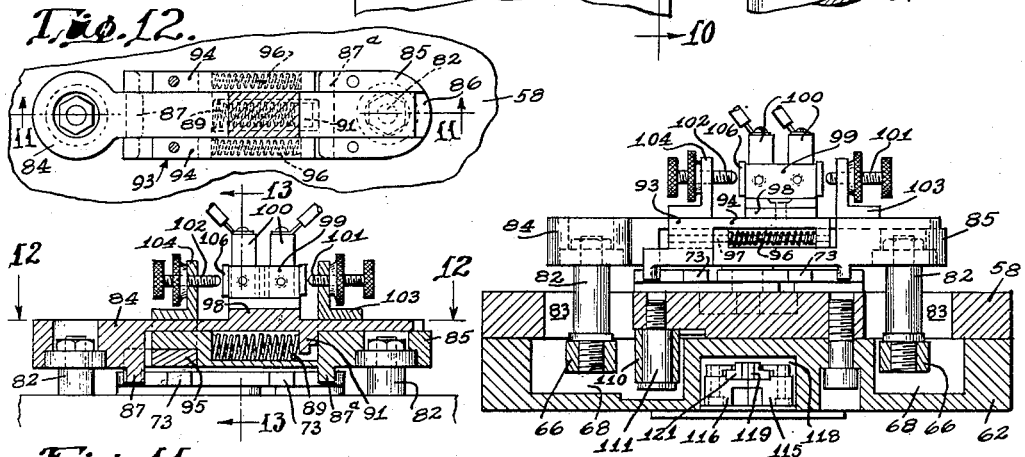
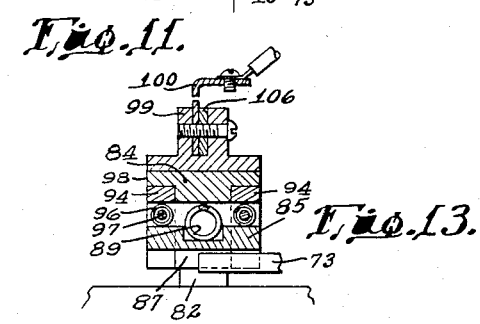
Inventors
W. J. FEDORCHAK
V. J. POLITSCH
L. H. WIDEMAN
D. M. DUNCAN
By Rule and Hoge
Attorneys

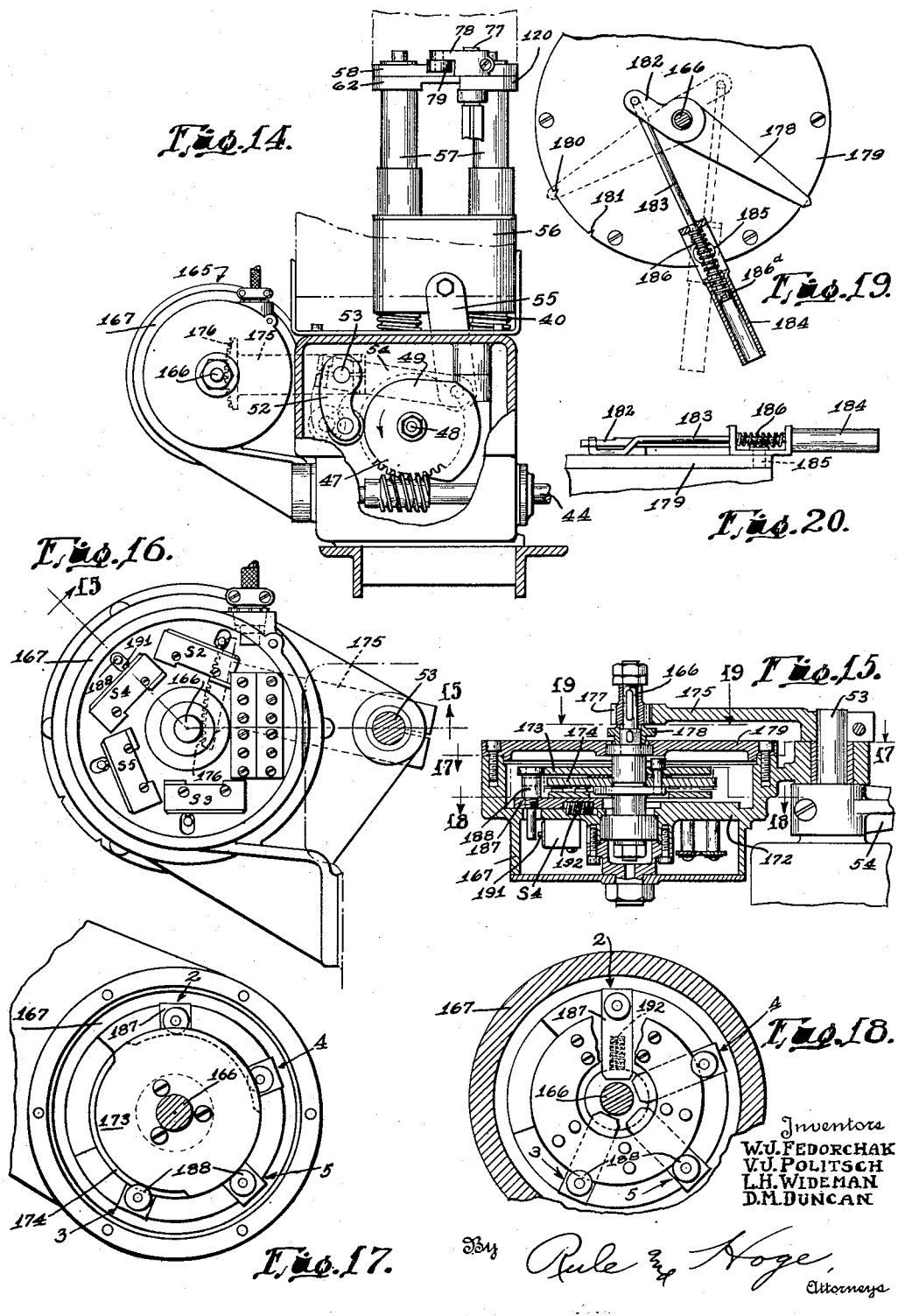

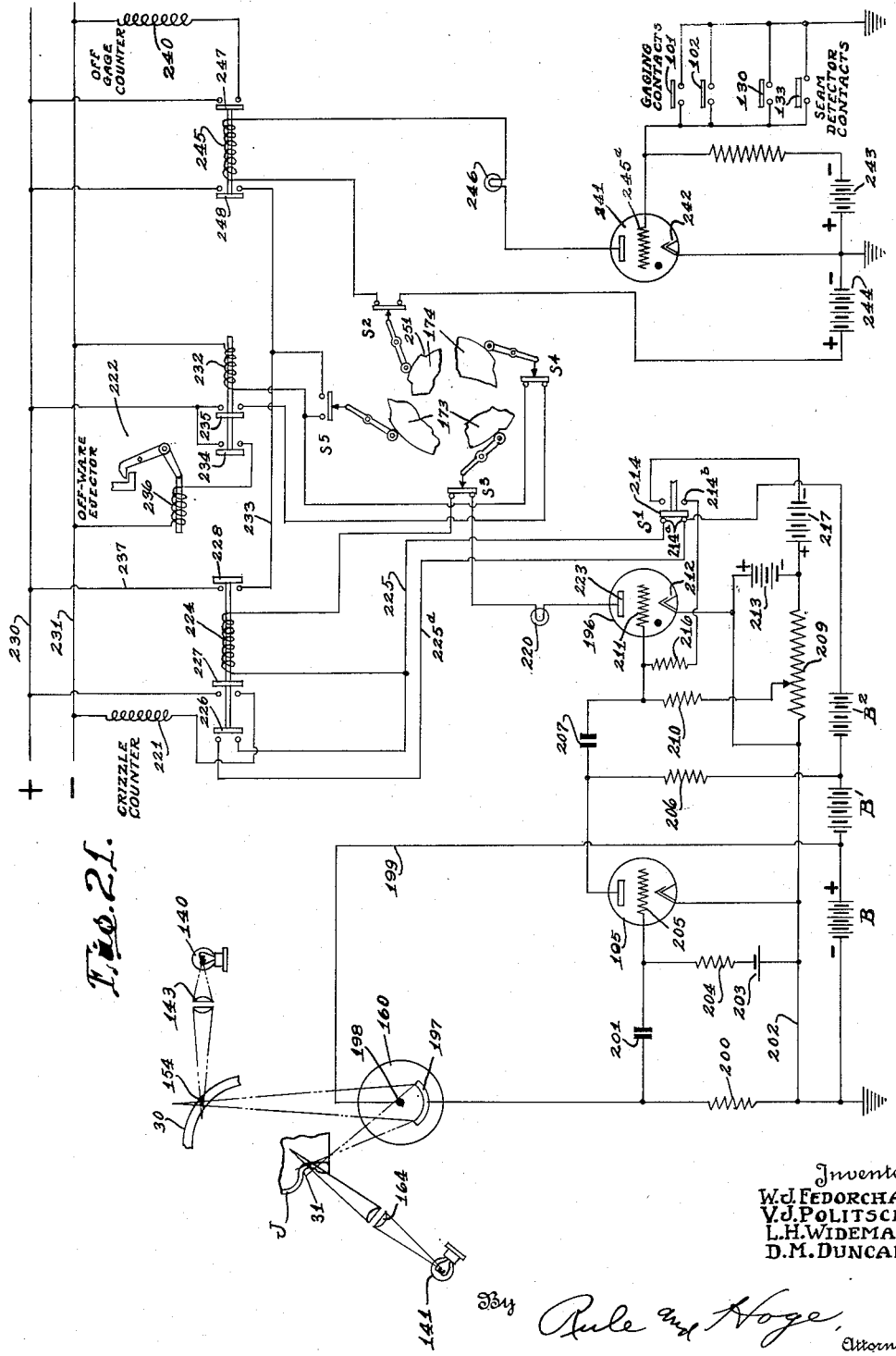

Patented July 6, 1954

2,682,802

UNITED STATES PATENT OFFICE 2,682,802

GAUGING AND DETECTING APPARATUS

William J. Fedorchak, Granite City, and Verney G. Politsch, Luther H. Wideman, and Donald M. Duncan, Alton, Ill., assignors to Owens-Illinois Glass Company, a corporation of Ohio Application August 23, 1946, Serial No. 692,574

6 Claims. (Cl. 88—14)

Our invention relates to apparatus for gauging bottles, jars or other articles made of glass or the like and at the same time, automatically inspecting certain surfaces of the articles and detecting any of various surface defects such as checks, fire cracks, crizzles, seams, or other surface irregularities and the like. The invention provides means actuated by any such defects, while a supply of the articles are being tested seriatim, to indicate the defective articles and segregate them from those which pass the tests.

The invention is particularly adapted for use in inspecting glass jars or other containers which are used for packing and hermetically sealing various products. Glass containers, owing to the methods of manufacture, are inherently subject to surface defects and irregularities such as minute cracks in the surface of the glass, crizzles, seeds, plunger marks, blisters, seams at the meeting faces of the sectional molds, and other defects. Any such defect in the sealing surface of a container may permit a slow leakage. An object of the present invention is to provide automatic means for detecting any such defects. The invention is designed to inspect articles automatically at a rapid rate as they are fed through the inspecting apparatus and automatically indicate and segregate the defective articles from those that pass the tests.

A further object of the invention is to combine novel article gauging apparatus cooperatively with concurrently operating detecting means for detecting various surface defects and causing articles which are defective or out of gauge to actuate electroresponsive means for discarding or separating such articles from those which pass the test.

A further object of the invention is to provide improved means for inspecting articles serially and by which a light beam directed against the surface under inspection, is reflected by a flaw in such surface and the light directed against a photoelectric cell which thereby is energized and operates through amplifying means to actuate a signal and/or rejecting mechanism for discarding the defective articles.

A further object of the invention is to provide a novel and compact arrangement and combination of a lamp or source of light, prisms or reflectors, and a photoelectric cell, all in close proximity to each other.

A further object of the invention is to provide improved gauging means operated mechanically in combination with mechanically operated seam detecting means, and electronic means operable by radiant energy within the spectral range for detecting surface defects and actuating rejecting mechanism common to all of said means.

Other objects of the invention will appear hereinafter.

Referring to the accompanying drawings:

Fig. 1 is a part-sectional plan view of an apparatus embodying our invention, the section being taken below the gauging head;

Fig. 2 is a fragmentary plan view, on a comparatively large scale, of the gauging head and parts mounted thereon;

Fig. 3 is a sectional elevation at the line 3—3 on Fig. 2;

Fig. 4 is a section at the line 4—4 on Fig. 3, showing seam detecting mechanism;

Fig. 4A is a part-sectional view of the same at the line 4A—4A on Fig. 5;

Fig. 5 is a fragmentary sectional elevation showing a wiper device and its operating means and parts of the seam detector;

Fig. 9 is a sectional elevation substantially at the line 9—9 on Fig. 2, on a larger scale;

Fig. 10 is a section at the line 10—10 on Fig. 9, showing particularly the gauging mechanism;

Fig. 11 is a section at the line 11—11 on Figs. 2 and 12, the section being taken through the gauging slide bars;

Fig. 12 is a section at the line 12—12 on Fig. 11;

Fig. 13 is a section at the line 13—13 on Fig. 11;

Fig. 14 is an elevation, with parts in section and parts broken away, showing means for lifting and lowering the workholder, and for operating the timer cams;

Fig. 15 is a section at the line 15—15 on Fig. 16, illustrating the cam timing control unit, including various control switches and their operating means;

Fig. 16 is an elevation of the control unit shown in Fig. 15, the front plate of the casing being removed;

Figure 22:
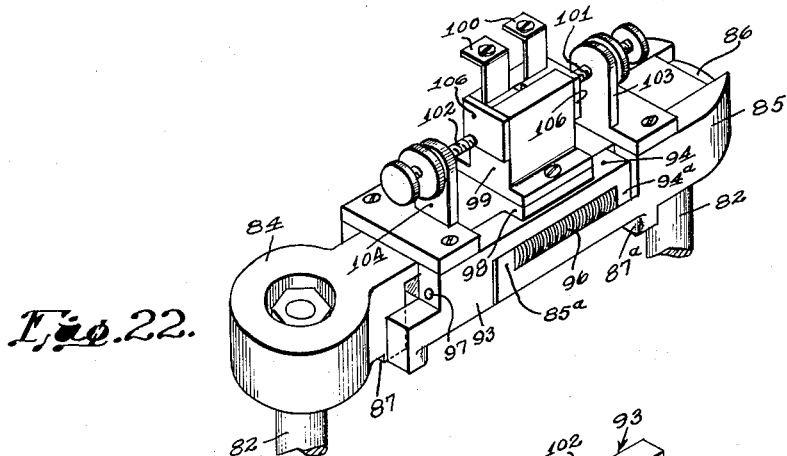

Figs. 17 and 18 are sections, respectively at the lines 17—17 and 18—18 on Fig. 15;

Fig. 19 is a section at the line 19—19 on Fig. 15 showing an indicator to indicate the extent of rotation of the switch operating cams;

Fig. 20 is an elevational view of the indicator shown in Fig. 19;

Fig. 21 is a wiring diagram of the apparatus and includes also a schematic view of the light condensing and directing means;

Fig. 22 is a perspective view of the gauging mechanism; and

Figure 23:
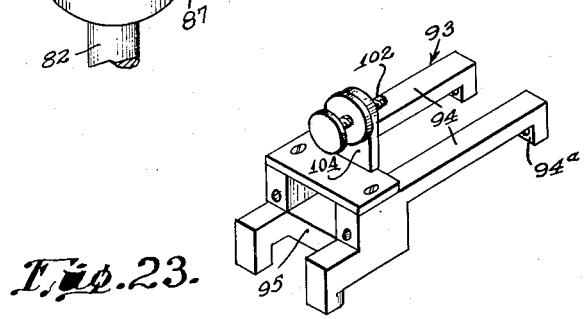
Figure 25:
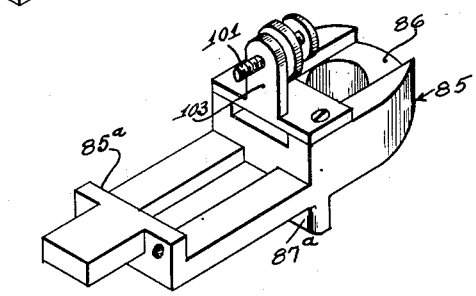
Figure 24:
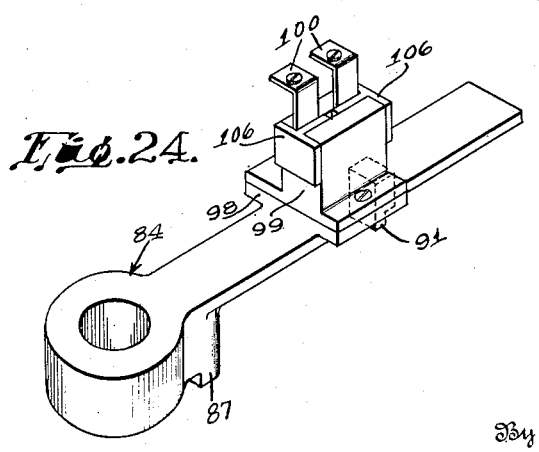

Figs. 23, 24 and 25 are perspective views of the relatively slidable elements comprising the gauging mechanism.

Referring to the drawings, the apparatus is adapted for testing glass jars J. As shown, for example, in Figs. 5 and 6, the jar is of the side-seal type having an annular, vertical sealing surface 30 between the top surface and the shoulder 31 of the jar. The apparatus includes means for rotating the jar about its vertical axis during the test and simultaneously inspecting both the sealing surface portion 30 and the shoulder portion 31 by directing a light beam against each said portion, causing any surface defect to reflect a portion of the light and direct it to a photoelectric cell which operates through suitable amplifying means to indicate the defect, all as hereinafter set forth. During the test, the jar gauging mechanism also operates on the surface 30 to indicate any deviations of said surface from the required diameter. Also, during the gauging operation, a seam detector operating on the sealing surface 30 indicates any seams or shoulders such as are commonly formed at the meeting edges of the mold sections in which the glass is blown.

Referring to Fig. 1, the jars are brought to the gauging apparatus by a horizontal continuously travelling belt conveyor 33. Positioned over the conveyor is a carriage 34 mounted for rotation about a vertical axis and carrying an annular series of work transfer units 35, each comprising a pair of gripping jaws 36. The carriage is rotated intermittently, step-by-step, in a counterclockwise direction by an electric motor 37, having driving connection with the carriage through a train of gearing including a sprocket chain 38. The carriage rotating mechanism driven by the chain 38 may be substantially the same as that shown and described in the patent to Fedorchak, #2,371,748, March 20, 1945, Article Handling Apparatus.

Each pair of jaws 36 is brought, while open, to a receiving position over the belt conveyor and the jaws are then operated to grip a jar and carry it to the testing station at which the jar is positioned over the worktable or platform 39. The jaws are then opened permitting the jar to be rotated about its axis during the test, after which the jaws again close and during succeeding step rotations of the carriage 34, transfer the jar to a position over the conveyor 33, the jaws then being opened to release the jar. The mechanism for opening and closing the jaws may be the same as that illustrated in the Fedorchak patent, above identified.

When a jar J is brought over the worktable 39 and the jaws 36 open to release the jar, it seats on a pad 42 (Fig. 3) which is supported on the table and journalled therein for rotation about a vertical axis. The pad 42 may be rotated continuously by means of gearing including a spur gear 39ᵃ on the stem of the pad, driven by a pinion 39ᵇ on a vertical shaft 39ᶜ which is rotated by the motor 37. The driving connections between the motor and the pad 42 may be the same as those fully disclosed in the patent to Fedorchak, #2,327,629, August 24, 1943, Gauging Machine.

The table 39 is attached to or formed integral with a head 56 which is slidably mounted for up-and-down movement on a pair of vertical posts 57 (Figs. 1, 3 and 14). The table is lifted by coil springs 40 under the control of a cam 49. The cam is driven by the motor 37 operating through a driving belt 43 and pulley 45 on a worm shaft 44 (Figs. 1 and 14). The worm shaft drives a worm gear 47 fast on a shaft 48 on which the cam 49 is mounted. The cam as it rotates intermittently rocks a rock arm 52 fixed to a shaft 53 to which is also secured a rock arm 54 connected through a link 55 to the head 56.

After a gauging operation, hereinafter described, the head 56 is moved downward by the motor operating through the linkage just described, against the expansive force of the springs 40. The jar on the worktable is thus lowered to a position free from the gauging apparatus, thereby permitting it to be transferred by the rotation of the carriage 34, to the belt conveyor 33. The interconnected driving mechanism between the motor, head 56 and carriage 34 is so designed that the operations of said parts are synchronized and timed to effect the lifting of the worktable, the testing operation, and lowering of the worktable, while the carriage 34 remains at rest, and then while the worktable is at rest in its lowered position, the operation of the workholding jaws 36 and rotation of the carriage for advancing the jar which has been tested and bringing the next succeeding jar into position and releasing it to the pad.

Figure 6:
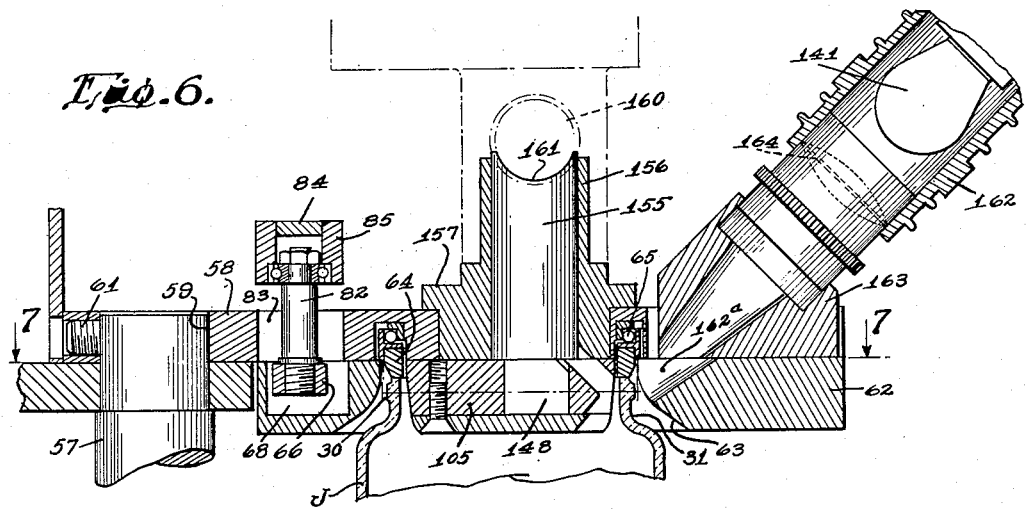
Fig. 6 is a sectional elevation at the irregular line 6—6 on Fig. 2, on a larger scale.

The gauging and detecting devices are mounted on a stationary head plate 58 secured to the posts 57. The head plate is provided with openings 59 to receive the upper ends of the posts, the plate being secured by set screws 61 (Fig. 6). Directly beneath the head plate is a plate 62 which serves as a light shield and guide for the workpieces. The plate 62 is provided with an opening 63 (Figs. 6, 7), of generally circular form extending through the plate. The walls of the opening are downwardly flared and serve as a guide for the neck of the jar J as the latter is moved upward to the testing position in which the neck and shoulder of the jar are positioned within the opening 63 as shown in Fig. 6. An anti-friction bearing ring 64 is mounted within the plates 58 and 62 in position to engage the top surface of the jar when the latter is moved to testing position, thus forming a stop for the jar which is held thereagainst by yielding pressure determined by the expansive force of the springs 40 (Fig. 14), the pressure being sufficient to hold the jar securely on the pad for rotation therewith. Ball bearings 65 permit the ring 64 to rotate freely with the jar.

The gauging mechanism for gauging the necks of the jars at the sealing surface 30 will now be described, such mechanism serving to indicate jars in which the diameter of said surface is either above or below the prescribed limits or in which said surface is "out of round" or non-circular. The gauging mechanism includes a pair of gauging arms 66 (Figs. 2, 7, 9, 10), each mounted to swing about a pivot bolt 67, said bolts having a fixed mounting in the head plate 58. The arms 66 are housed in recesses 68 formed in the plate 62. Each arm carries a roll 69 pivoted intermediate the ends of the arm in position to bear against the sealing surface of the jar during the gauging operation.

Means for spreading the gauge arms 66 to permit the jar to be moved to gauging position between the rolls, includes a slide bar 71 (Figs. 2, 3) mounted for lengthwise sliding movement. The slide bar is connected near its forward end by a pivot bolt 72 to a pair of bell crank levers 73 which swing on pivots 74 attached to the head plate. The slide bar 71 is actuated by a cam 75 (Fig. 1) connected to the shaft 48 or to the cam 49 on said shaft. The cam 75 operates a rock arm 76 on a rock shaft 77 (Figs. 1 and 2). A rock arm 78 on the shaft 77 carries a roll 79 which bears against the end of the slide bar 71. The cam 75 operates through the connections just described to move the slide bar 71 forward for spreading the gauging arms as presently described. The cam is timed to move the slide bar forward and spread the arms immediately after a gauging operation, and holds it in its forward position until the next succeeding jar is moved upward to gauging position. The slide bar is then released from its cam control and is retracted by a coil compression spring 81 (Fig. 3), thereby releasing the gauging arms for the testing operation.

Secured to the inner or free ends of the gauge arms 66 are posts 82 (Figs. 6, 7) which extend upwardly through openings 83 in the head plate 58. Slide bars 84 and 85 are pivoted at their outer ends to the posts 82 respectively and extend inwardly between the gauge arms with the slide bars overlapping in telescopic or sliding connection with each other, permitting contracting and expanding movement of the slide bars as the gauge arms move toward and from each other. As shown in Figs. 12, 22, and 25, the bar 85 is formed with a slideway 86 extending lengthwise thereof in which the outer end portion of the bar 84 is slidable. The bars 84 and 85 are formed respectively with lugs 87 and 87ª extending downward into the path of the bell crank levers 73. A coil spring 89 (Figs. 11, 12, 13) seated in a recess formed in the slide bar 85, is held under compression between the slide bars. One end of the coil spring bears against a lug 91 which projects downward between the spring and the end wall of the recess in which the spring is housed. The spring tends to spread the gauge arm 66, the spreading movement being limited by the stop lug 91 bearing against the arm 85.

An intermediate slide member 93 extending lengthwise of the slide bars 84 and 85 and mounted in slidable relation thereto, comprises parallel spaced arms 94 connected at one end by an integral head or cross member 95. The slide member 93 is mounted for sliding movement with the bar 85, being yieldingly connected thereto through coil compression springs 96 mounted on guide rods 97 attached to the arms 94. The springs 96 which are weak as compared with the spring 89, are held under compression between a rib 85ª on the slide bar 85 and lugs 94ª on the slide member 93 (Fig. 10). The relative movement of the slides 93 and 85 under the force of the spring is limited by the rib 85ª on the slide 85 abutting the head of the slide 93 (Figs. 10, 22).

The slide bar 84 is formed intermediate its ends with a raised portion or platform 98 on which is mounted a bracket 99 carrying a pair of posts or electrical contact strips 100. Electrical contact screws 101 and 102 are adjustably mounted respectively in brackets 103 and 104. The bracket 103 is attached to the slide bar 85 and moves therewith. The bracket 104 is attached to the intermediate slide member 93.

The operation of the gauging mechanism is as follows:

While the gauging head is empty the telescopically connected slide bars 84 and 85 are held in their contracted position by the coil spring 89 (Fig. 11) and with the slide member 93 in its stop position relative to the bar 85 as shown in Fig. 10. With the parts in this position, the contact screws 101 and 102 are held spaced apart from the contact plates 106. When the slide bar 71 (Fig. 2) is moved forward as above described to spread the gauging arms 66, the contact bars 84, 85 are extended, thus allowing a jar J to move upward to the gauging position between the rolls 69. The jar is centered in this position by a tapered centering block 105 (Figs. 3, 6, 7) mounted centrally within the opening 63 in the plate 62. The slide bar 71 is then withdrawn and the spring 89 operates through the gauging arms to move the rolls 79 into contact with the sealing surface 30 of the jar which is rotated while in the gauging position, the rolls being held in contact with the surface 30 during at least one complete rotation of the jar.

If the diameter of the sealing surface 30 is of the specified gauge or within the prescribed limits of tolerance, the contact screws 101 and 102 are held in spaced relation to the contact plates 106 which are electrically connected to the posts 100. If the sealing surface is oversize, the slide bar 84 will be moved to the left relative to the bar 85, carrying with it the bracket 99 (Fig. 24) and parts thereon. A contact plate 106 will thus be moved into engagement with the contact screw 102 carried on the slide member 93, thereby completing a control circuit for effecting the operation of the off-gauge counter and off-ware ejector, as hereinafter described. The coil springs 96 maintain a yielding pressure of the contact plate 106 against the contact screw while the slide member 93 moves with the slide bar 84 during any further spreading of the gauge arms after contact is made.

If the diameter of the surface 30 under test is below the prescribed gauge, the gauging arms will be drawn toward each other by the expansive force of the pressure spring 89, the slide bar 84 being moved to the right (Figs. 10, 11) relative to the slide bar 85. This movement of the slide bar 84 to the right when the diameter of the surface 30 is below gauge, moves the contact plate 106 into engagement with the contact screw 101 on the slide bar 85, thereby completing the control circuit for the off-gauge counter and off-ware ejector. It will be noted that the gauging arms 66 and gauging assembly (Fig. 22) carried thereby are mounted to float so that they adjust themselves to the position of the jar, maintaining the contact screws 101 and 102 out of contact with the plates 106 when the surface under test is of the prescribed gauge. During the test, an oversize jar draws the slide bar 84 outward to engage the contact screw 102 and an undersize jar moves the contact bar 84 to the right to engage the contact screw 101. If the surface under test is "out of round" it will operate to establish the control circuit in the same manner as a surface which is either over or under size.

The contact screws 101 and 102 are adjustable for gauging surfaces of different diameters and also for varying the differential between prescribed maximum and minimum limits. Individual adjustment of the contact screws also permits independent adjustment of tolerances for maximum and minimum diameters.

Figure 7:
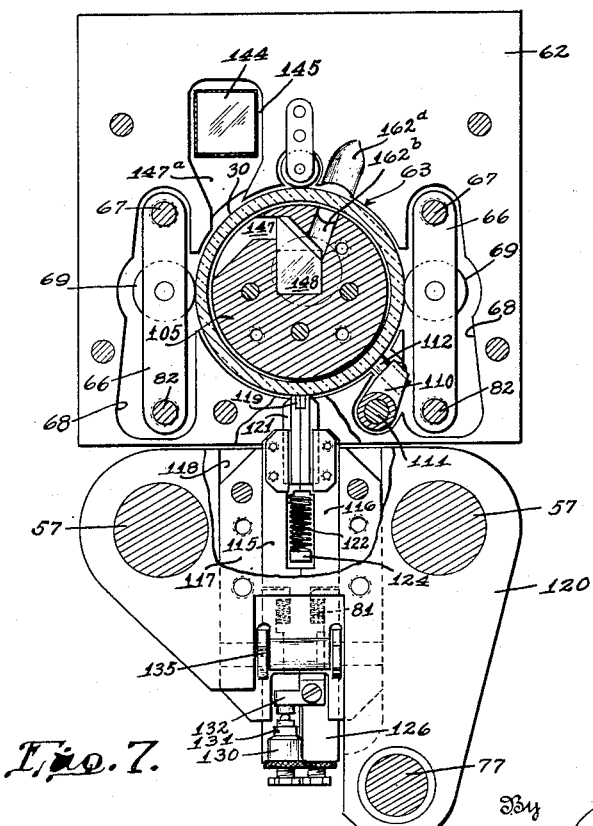
Fig. 7 is a sectional plan at the line 7—7 on Fig. 6.

A wiper device is provided for cleaning the surface under test. Referring to Figs. 5 and 7, this device comprises a rocker 110 mounted to swing on a pivot pin 111. The rocker comprises an arm carrying a wiper 112 which bears against the surface of the jar. The wiper may consist of an absorbent felt pad containing a lubricant to protect the surface of the glass from scratching or abrasion. The rocker includes an arm 113 connected through a coil spring 114 to the slide bar 71. When the slide bar is in its retracted position, the coil spring 114 is under tension which operates through the rocker 110 to hold the wiper yieldingly against the surface of the jar.

Seam detector

The detector mechanism for detecting seams, shoulders, or other abrupt surface changes or irregularities in the sealing surface is as follows:

The detecting mechanism (see Figs. 3, 4, 4A, 7) comprises a pair of slide plates 115 and 116 each mounted for a short sliding movement lengthwise within a slide holder 117, the latter being positioned within a channel 118 (Fig. 7) in a triangular plate 120 supported on the posts 57. Contact points 119 of hardended metal or the like are secured by connecting strips 121 to the plates 115 and 116 respectively, said contacts being adapted to bear against the surface under test. A coil spring 122 is positioned between the plates 115 and 116 and bears at one end against a stop lug 123 attached by a screw 124 (Fig. 3) to the holder 117. The other end of the spring bears against shoulders formed on the slide plates 115 and 116, thereby holding the contact points 119 in line so that both points bear against the surface under test. Slide bars 125 and 126 individual to the slide plates 115 and 116 respectively, are mounted in sliding relation to the plates 115 and 116. The bar 125 is provided with a widened section 127 which is positioned within a corresponding recess in the plate 115, the recess being of a length to permit a short relative sliding movement of the bar 125 and plate 115. A coil spring 128 is held under compression between the bar 125 and plate 115. The bar 126 and plate 116 are formed and arranged in like manner for a short relative sliding movement. A microswitch 130 is connected to the slide bar 125 by a bracket 131 and is operable by a contact member 132 attached to the slide plate 116. A microswitch 133 (Figs. 4A, 5) is attached to the slide bar 126 and is actuated by a contact 134 connected to the slide plate 116.

While the gauging contacts 119 are in line (Fig. 4), the microswitches 130 and 133 are held free or separated from their operating contacts. If either of the gauging contacts 119 is moved either forwardly or rearwardly relative to the other, the relative movement of the slides 115, 116 actuates one or the other of the microswitches. For example, if the slide plate 116 is moved back relative to the plate 115 as by a seam or shoulder on the surface under test, the contact member 132 will actuate the switch 130. The coil spring 128 permits the switch 130 to yield and move rearwardly with the contact 132 a short distance, limited by a stop bar 135. The microswitches 130 and 133 are connected in circuit with control devices as hereinafter described.

Crizzle detector

A description will now be given of the electronic mechanism for detecting surface checks, cracks, crizzles, and the like in the surfaces under test.

Such "crizzle detector" mechanism includes means for directing a beam of light against the surface under test, so that any cracks, checks or the like in such surface will serve as a mirror for reflecting a portion of the light beam, the reflected light being directed to a photoelectric cell and thereby causing an electrical impulse which is amplified and serves to operate signalling devices and selective mechanism for segregating defective articles from those which pass the test.

The apparatus includes two separate light sources herein shown as electric lamps 140 and 141 (see Fig. 21) from which beams of light are directed respectively, against the side sealing surface 30 and the shoulder surface 31 of the jar under test. The lamp 140 (Figs. 3 and 9) is attached to the upper end of a tubular holder 142 mounted on the head plate 58. The light beam is passed through a condensing lens 143 within the tube and is directed against a triangular prism 144 (Figs. 3 and 7) mounted in a recess 145 within the plate 62. The prism 144 of leucite, glass or the like, is provided with a reflecting surface 146, which as shown, is at an angle of 45° to the vertical so that the light beam is reflected horizontally therefrom through the channel or recess 145 and strikes the vertical sealing surface 30 at an angle of 45° more or less. The point of contact of the reflected light beam with the surface 30 is preferably a short distance within the focal point of the light beam as indicated in Fig. 21.

Figure 8:
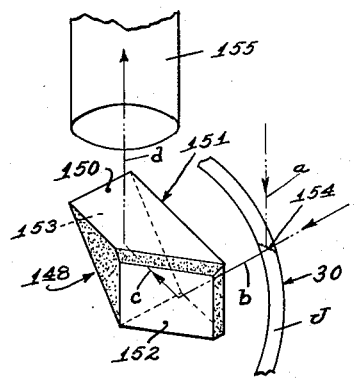
Fig. 8 is a partly diagrammatic perspective view showing a reflection prism.

The reflected beam of light passes through a channel 147$^a$ in the plate 62, strikes the surface 30 and passes through the glass. Any surface check, crack or the like, extending vertically or in some other direction along said surface, when it traverses the beam of light, will present a reflecting surface to the light beam which will cause a reflection of the light or a portion thereof and direct it through a channel 147 (Fig. 7) in the block 105 to a reflecting prism 148 in the path of the light beam. The reflection from the said reflecting surface consists of a flash of light which occurs when the light beam strikes such surface and the direction of the reflected light is at an angle to the normal direction of the light beam or portion thereof which may be deflected from the adjoining portion of the surface under test. The prism 148 of white transparent leucite or other suitable material, has a horizontal top surface 150 (Fig. 8), a vertical side surface 151, a vertical reflecting surface 152 at an angle of 45° to the surface 151, and a reflecting surface 153 inclined at 45° to the horizontal. The reflecting surfaces 152 and 153 are coated with a reflecting material.

As the jar J under test is rotated, any crack 154 or similar defect, as it crosses the path of the incident beam of light transmitted in the direction a (Fig. 8), is reflected by the broken surface at 154 and is directed horizontally in the line b to the reflecting surface 152, from which it is reflected horizontally in the direction c to the reflecting surface 153 and is again reflected to the vertical path d and passes upward through a cylindrical lens 155 of transparent leucite or the like. The lens 155 is enclosed in a vertical pickup tube 156 of opaque material mounted on the head plate 58 and formed with a rectangular base 157 attached by screw bolts 158 (Fig. 2) to the head plate. The photoelectric cell 160 is supported on the cylindrically concave upper end surface 161 of the lens 155.

The electric lamp 141 used in detecting defects in the shoulder surface 31 of the jar, is mounted in the upper end of an inclined tubular holder 162 attached to a base block 163 (Fig. 6) supported on the plate 62. The plate 62 is recessed at 162ª and the centering block 105 is formed with a channel 162ᵇ (Fig. 7) for the passage of the light beam. The light beam from the lamp 141 is directed through a condensing lens 164 (see Fig. 21) and strikes the shoulder surface 31 at a point a short distance within the focal point of the light beam. A defect in the surface 31 will reflect a portion of the light and direct it toward the prism 148. The light passing through the prism strikes the reflecting surface 153 and is reflected upwardly through the lens 155 to the phototube.

During the test a series of microswitches are operated automatically in a predetermined order of sequence, the operations being cam controlled. The cam timing control unit 165 for effecting such operations, is illustrated in Figs. 1, and 14 to 21 inclusive. It comprises a cam shaft 166 journalled in a case 167 within which are mounted microswitches S2, S3, S4 and S5 attached to a partition wall 172 within the case. The switches are controlled and actuated by disk cams 173 and 174 fixed to the cam shaft 166.

The cam shaft 166 is rotated by means of a rock arm 175 keyed to the rock shaft 53, said rock arm being formed with a segmental rack 176 in mesh with a pinion 177 keyed to the cam shaft. When the shaft 53 is rocked in the direction to lift the worktable and bring a workpiece into testing position as before described, the rock arm 175 operates to rotate the cam shaft 166 and bring the cams 173 and 174 to a position determined by the height to which the worktable is lifted. The cam shaft then remains at rest during the testing of the workpiece.

After the test is completed, the slide bar 71 is again moved forward by its cam and spreads the gauge arms to release the workpiece. Immediately following this, the cam 49 (Fig. 14) operates to lower the worktable and also to rotate the cam shaft 166 in the reverse direction to that above described, thereby actuating the cam controlled microswitches in the manner described hereinafter.

Means for indicating the position to which the worktable is lifted, comprises a pointer 178 (Fig. 19) consisting of a rock arm keyed to the shaft 166 and movable over the face plate 179 of the case 167. While the worktable is in its lowered position, the pointer 178 is in the position shown in full lines (Fig. 19). When the worktable is lifted, the pointer is swung in a counter-clockwise direction to the dotted line position (Fig. 19), designated by an indicating means such as a notch 180. If there is no jar or workpiece on the worktable to stop its upward movement by the jar coming in contact with the bearing ring 64 (Fig. 6), the table will move to a higher level and be arrested with the pointer at the indicating notch 181. The additional upward movement of the worktable above its normal lifted position operates through the cam control mechanism to prevent the apparatus from indicating and registering a defect as it would otherwise if the workpiece were missing. Such operation will be described hereinafter.

A spring buffer device is connected between the cam shaft 166 and stationary cover plate 179 (see Figs. 19, 20). It comprises a rock arm 182 fixed to the shaft 166, a rod 183 pivoted at one end to the rock arm, a rocker 184 with which the rod is telescopically connected, and a buffer spring 186. The rocker is connected by a pivot 185 to the plate 179. The coil spring 186 is mounted on the rod 183 and is held under compression between the end of the rocker 184 and a head 186ª on the rod. Said head is slidable in a tubular section of the rocker.

The spring 186 being under compression applies a turning moment to the cam shaft, both while the worktable is in its lifted position and while in its lowered position, thereby assisting the starting and stopping movements. The spring is compressed as the worktable approaches either limit of its up and down movements and expands as the worktable moves toward an intermediate position.

Referring to Figs. 15 to 18, the operating connections between the cams 173, 174 and the microswitches, include slide bars 187 individual to the switches and mounted for radial sliding movement toward and from the cam shaft. The slide bars carry posts 188 with cam follower rolls 2, 3, 4, 5 thereon, individual respectively to the switches S2, S3, S4 and S5. The posts are extended downward to positions in front of operating contacts 191 of the switches. The follower rolls are held against the cams by compression coil springs 192.

Referring to the wiring diagram (Fig. 21), when the photocell 160 is energized by a light beam, the signal is amplified by amplifying means including a vacuum tube 195, herein shown as a triode, and a gas filled tube 196 or thyratron. A beam of light thrown on the cathode 197 of the photocell causes a current impulse through the circuit of the cell from the anode 198 through wire 199, battery B and resistor 200. The current impulse upsets the voltage balance across a condenser 201 in a circuit including the resistor 200, ground wire 202, battery cell 203, and resistor 204. This raises the voltage on the grid 205 of tube 195, thereby causing a current flow in the plate circuit of the tube, said circuit including a resistor 206, B batteries, $B^1$, B, and ground wire 202. The current impulse in the plate circuit upsets the voltage balance in a condenser 207 connected in a circuit comprising the resistor 206, B batteries, $B^1$, B, ground wire 202, a variable resistor 209 and resistor 210. The current flow or impulse thus produced causes the grid 211 of the gas tube 196 to become less negative. The rise in the grid voltage causes the tube to fire. The grid is normally maintained at a negative potential with respect to the cathode 212 by a battery 213 having its positive plate connected to the cathode and its negative terminal connected through resistors 209 and 210 to the grid. The battery 213 is connected across the variable resistance 209; adjustment of the latter adjusts the voltage on the control grid. The potential maintained on the grid by the battery 213 is sufficiently negative to prevent firing of the tube until raised by upsetting the voltage balance across the condenser 207, as above described.

In order to positively prevent firing of the tube 196 at any time except while the worktable is in lifted position for the testing operation, a paralyzer is provided for the grid circuit controlled by a double switch S1 comprising a contact bar 214. The switch S1 (Figs. 2, 3) has a stationary mounting on the gauging head and is actuated by an arm 215 on the pivot pin 72. When the slide bar 71 is moved forward to spread the gauge arms while a workpiece is being lifted into position for the test, the contact arm 215 is swung free from the switch, permitting the latter to assume the position shown in Fig. 21 in which the contact bar 214 bridges contacts 214ª. When the test is completed and the workpiece lowered, slide bar 71 is withdrawn to release the switch which is thereby reversed so that the contact bar 214 bridges contacts 214ᵇ. This connects the grid 211 through a resistor 216 to the negative terminal of a battery 217 connected in series with the battery 213 and thereby maintains the grid 211 sufficiently negative with respect to the cathode 212 to positively prevent firing of the tube by any signal transmitted through the amplifier tube 195.

The devices adapted to be actuated under the control of an amplified signal from the phototube include a signal lamp 220, a counter comprising a magnet coil 221, and an "off-ware ejector" 222. The counter, herein referred to as the "crizzle counter," may be of conventional construction adapted to register each energization of the coil 221. The off-ware ejector may consist of mechanism designed for ejecting defective ware, as for example, the ejector mechanism shown in Patent #2,338,868, to E. R. Owens, January 11, 1944, Gauging Apparatus.

When the worktable is lifted and a workpiece or jar brought to testing position, the various switches and relays are brought to the positions shown in the diagram (Fig. 21). If there is no defect in the jar under test, the switches remain in status quo during the test. If, during the test, the thyratron 196 is fired by an amplified signal from the phototube, a current flow is set up in the plate circuit of the thyratron. Said circuit may be traced from the plate 223 through the signal lamp 220, switch S3, a relay coil 224, wire 225, switch S1, B batteries, B², B¹, B, and ground wire 202 to the cathode 212. The signal lamp 220 is thus lighted and the relay coil 224 operates to close the contact bars 226, 227 and 228.

The contact bar 227, when closed, completes a circuit for the crizzle counter coil 221, which is connected across the mains 230 and 231 leading from a source of current supply. The contact bar 226 bridges contacts connected in parallel through wires 225, 225ª, with contacts 214ª of switch S1 thereby providing a holding circuit for coil 224 when switch S1 is reversed. The contact bar 228 is in a circuit with a relay 232, which circuit may be traced from the main 230 through wire 237, contact 228, wire 233, open switch S5, and coil 232. When energized, the relay coil 232 moves contact bars 234 and 235 to closed position, thereby completing a circuit for the operating coil 236 of the off-ware ejector. The circuit of the magnet coil 232 is open at the switch S5; the operation of the relay 224 has no immediate effect on the off-ware ejector.

The switches now remain in status quo with the switch operating cams 173 and 174 at rest until the gauging operation is completed. The slide bar 71 (Fig. 2) is then moved forward by its cam to spread the gauging arms and withdraw them from the workpiece. Immediately following this, the worktable is lowered by its cam 43 (Fig. 14) as heretofore described. The forward movement of the slide bar releases the switch S1 which is thereby reversed so that the paralyzing circuit through the battery 217 is closed as above described, thus preventing any false signal when the workpiece is moved downward. When the switch S1 is thus reversed, the plate circuit of the cell 196, extending through the relay coil 224, remains closed through the holding contact bar 226.

When the work-holding pad starts downward, the switch cams 173 and 174 are rotated. The switch S5 is first closed before the switches S3 and S4 are opened by their cams. This completes the circuit for the relay coil 232. This circuit may be traced from the positive main 230 through wire 237, contact bar 228, wire 233, switch S5, and relay coil 232. The latter is thus energized, closing the contact bars 234 and 235. The bar 234 completes the circuit for the off-ware ejector coil 236, thereby causing an operation of the ejector or ejector trip device 222, permitting the ejector to operate and discharge the defective jar when the ejecting station is reached. When the switch S3 opens, it breaks the circuit through the relay coil 224 so that the relay opens the circuit through the crizzle counter 221 at contact bar 227. When the switch S4 is opened by its cam, the relay coil 232 in circuit therewith is de-energized, thereby opening the circuit of the off-ware ejector coil.

The off-ware ejector 222 serves not only for ejecting off-ware operating through the photocell, but also is operative for rejecting off-gauge ware indicated by the gauging mechanism and off-ware indicated by the seam detector mechanism. An off-gauge counter comprising a magnet coil 240 registers the off-gauge ware and also the defective ware indicated by the seam detector. The operation of the counter coil 240 and the ejector 222 for ejecting off-gauge and seam ware are under the control of a thyratron 241. The cathode 242 of the tube is connected to the grounded positive terminal of a battery 243 in the control grid circuit which maintains a negative voltage on the grid 245ª. The plate circuit of the tube includes a battery 244 which maintains a positive voltage on the plate, said circuit being extended through the switch S2, a relay magnet coil 245 and a signal lamp 246. If, during the test, either of the gauging contacts 101 and 102, operated respectively by ware below and above gauge as heretofore described, is closed by the ware being out of gauge, or if either of the seam detector switches 130 and 133 is closed, the control grid 245ª is thereby grounded and thus brought to the same potential as the cathode 242. This results in the tube being fired by the battery 244, so that the signal lamp 246 is lighted and the relay coil 245 is energized and moves the contact bars 247 and 248 to closed position. The magnet coil 240 is thus energized and the off-gauge counter operated to register the defective article. The closed contact bar 248 is in circuit with the switch S5 so that when the latter is closed after the completion of the gauging operation, it completes a circuit from the main 230, through the contact bar 248, switch S5 and relay coil 232 to the main 231. Coil 232 now operates to complete the circuit for the off-ware ejector coil 236, thus permitting operation of the off-ware ejector.

It will be noted that the crizzle counter 221 and the off-gauge counter 240 operate independently of each other. Thus, for example, if the jar under test has a crack or crizzle detected by the phototube and also is off-gauge, it effects the operation of both counters. This enables the counters to register the number of defective articles due to either type of defect, regardless of whether or not both types of defect may appear in the same article.

Means are provided for preventing an off-gauge indication when the machine indexes without a jar in the gauging head. If the work-pad is empty when lifted, the below gauge contact 101 and seam detector contacts 130, 133, move to closed position. This, without some preventing means, would cause the thyratron 241 to fire and operate the off-gauge counter and off-ware ejector, as heretofore described. In order to prevent such a false operation, the cam 174 is formed with a dip section 251 in position to open the switch S2 when the cam is rotated beyond its normal position, such rotation taking place when there is no jar on the pad to limit the upward movement. The opening of the switch S2 by the cam section 251, holds the plate circuit of the thyratron 241 open so that the closing of the gauging and seam detector contacts cannot effect operation of the tube. Thus operation of the off-gauge counter and off-ware ejector while the gauging head is empty is prevented.

Modifications may be resorted to within the spirit and scope of our invention.

We claim:

1. Apparatus for detecting surface flaws in the round exterior side-sealing surface formed on the upper, open neck end of a transparent glass container, said apparatus comprising a stationary horizontal plate having a downwardly flared approximately circular opening therethrough, a support for the container spaced below said opening, means for moving said support upwardly with a container in upright position thereon and thereby moving the neck portion of the container upwardly within said opening, means for rotating the container about its vertical axis while the neck portion is within said opening, said plate having a radially disposed channel extending therein to said opening for the passage of a light beam, means for directing a light beam from a point exterior to the container through said channel and causing it to impinge on the said exterior sealing surface at an acute angle, a centering block mounted in fixed position relatively to said stationary plate and positioned to enter the container as the latter is moved upwardly, a reflecting prism mounted within said block in the path of a light ray reflected by a defect in said surface, and a photoelectric cell in the path of the light reflected from said prism.

2. Apparatus for testing a hollow glass article having a round exterior surface for detecting flaws in said surface, said apparatus comprising a support for the article, means for rotating the support and the article thereon about the axis of said article, a light source, means for positioning the light source at a point exterior to the said article and its support, means for condensing a beam of light from said source and converging the beam toward a focal point and directing it against said exterior surface during the said rotation and thereby causing the beam to scan said surface, the direction of said beam being such as to cause a crack or other defect in said surface to reflect a light ray and project it through the glass into the interior of said article, a light reflecting prism, means for mounting said prism, means for lifting and lowering said support with the article thereon, to and from a position in which the prism is within said article in the path of said reflected light ray, said prism having a reflecting surface from which the light ray is reflected, and indicating means actuated by the reflected light ray for indicating the defect.

3. Apparatus for testing a hollow glass article having a round exterior surface for detecting flaws in said surface, said apparatus comprising a support for the article, means for rotating the support and the article thereon about the axis of said article, a light source, means for positioning the light source at a point exterior to the said article and its support, means for condensing a beam of light from said source and converging the beam toward a focal point and directing it against said exterior surface during the said rotation and thereby causing the beam to scan said surface, the direction of said beam being such as to cause a crack or other defect in said surface to reflect a light ray and project it through the glass into the interior of said article, a light reflecting prism, means for mounting said prism, means for lifting and lowering said support with the article thereon, to and from a position in which the prism is within said article in the path of said reflected light ray, said prism having a reflecting surface from which the light ray is reflected, a photoelectric cell in the path of the light ray reflected from the prism, amplifying means for amplifying an electrical impulse produced in the cell by said light ray, and indicating devices actuated by the amplified electrical impulse.

4. Detecting apparatus for detecting defects in an exterior circular surface of a hollow transparent glass container, said surface being concentric with the vertical axis of the container, said apparatus comprising a support for the container, means for rotating the support and the container thereon about said vertical axis, a light source exterior to said container, means for condensing a light beam from said source and directing it horizontally against the rotating surface under test at an angle to said surface of approximately 45° and thereby causing a reflection of a portion of the incident light beam by a surface defect of the glass traversing the light beam, and by which the reflected light is directed into the container, a prism, means for mounting the prism in a predetermined position, means for lifting and lowering said support and the container thereon, into and out of a position to bring the prism within the container in the path of the reflected light, said prism having reflecting surfaces positioned and arranged to further reflect the said reflected light and direct it upwardly, a photoelectric cell in the path of said upwardly directed light, and indicating means actuated by said cell.

5. Detecting apparatus comprising a horizontally disposed stationary plate having an approximately circular opening therethrough, a support for a glass jar spaced below said opening, means for moving the support with the jar thereon upwardly to a testing position in which the neck of the jar is within said opening, a centering block mounted in a fixed position in which it enters the neck of the jar when the latter is moved upward to testing position, means for rotating the jar about its vertical axis while in testing position, a reflector mounted in said plate in a position exterior to and spaced from the said opening in the plate, a light source, means for supporting the light source in a position exterior to said jar, means for condensing a beam of light from said light source and directing it against said reflector, said reflector being positioned to reflect the light beam and direct it against the neck of the jar, said plate having a channel extending therein from the reflector to said opening providing a path for the reflected light beam, a reflecting prism mounted within said centering block, a second light source mounted in a position exterior to said jar, means for directing a beam of light from said second light source against a different surface portion of the jar, said reflecting prism being positioned to receive reflected light from both said light sources when reflected from the jar, and a photoelectric cell spaced above said prism, the latter having reflecting surfaces arranged to direct the reflected light from both said sources upwardly against the photoelectric cell.

6. Apparatus for testing the surface of a workpiece for any flaw therein which presents a light reflecting surface at an angle to the adjoining portion of the surface under test, said apparatus comprising a workholder for supporting the workpiece, means for moving the workholder and workpiece thereon to and from a testing position, means for rotating the holder and workpiece while in said testing position, a light source, means for directing a beam of light therefrom against the said rotating surface and thereby causing a said flaw, when brought into the light beam, to reflect a portion of the light beam, a photoelectric cell, means for directing the reflected radiation against said cell and thereby producing an electrical impulse, means for shielding the cell from radiation of said beam reflected from the said surface under test, means for amplifying the said impulse, said amplifying means comprising an electronic tube, a signal device in the plate circuit of the tube actuated by said amplified impulse, automatic means for rendering said tube unresponsive to a said amplified impulse while the workholder is withdrawn from said testing position, the said means for rendering the tube unresponsive comprising a paralyzer in the grid circuit of said tube, a switch in circuit with the paralyzer, and automatic means for opening the switch when the workholder and workpiece are brought to said testing position and for closing said switch before the workholder and workpiece are withdrawn from the testing position.

References Cited in the file of this patent

UNITED STATES PATENTS

| Number | Name | Date |
|---|---|---|
| 715,393 | Koehler | Dec. 9, 1902 |
| 1,874,113 | Morgan | Aug. 30, 1932 |
| 1,934,187 | Glasgow | Nov. 7, 1933 |
| 1,947,729 | Morrison | Feb. 20, 1934 |
| 2,054,320 | Hanson | Sept. 15, 1936 |
| 2,131,096 | Cox | Sept. 27, 1938 |
| 2,132,447 | Stout | Oct. 11, 1938 |
| 2,137,187 | Stoate | Nov. 15, 1938 |
| 2,192,580 | Sachtleben | Mar. 5, 1940 |
| 2,318,856 | Hoffman | May 11, 1943 |
| 2,327,629 | Fedorchak | Aug. 24, 1943 |
| 2,334,475 | Claudet | Nov. 16, 1943 |
| 2,335,686 | Mercur | Nov. 30, 1943 |
| 2,338,868 | Owens | Jan. 11, 1944 |
| 2,352,091 | Fedorchak et al. | June 20, 1944 |
| 2,355,719 | Fedorchak | Aug. 15, 1944 |
| 2,481,863 | Owens | Sept. 13, 1949 |
| 2,643,767 | Baker | June 30, 1953 |

FOREIGN PATENTS

| Number | Country | Date |
|---|---|---|
| 67,017 | Norway | Nov. 1, 1943 |

OTHER REFERENCES

"Hartford-Empire Develops Inspector for Finish Checks," an article in "The Glass Industry" for April 1945 on pages 176 and 203. (Copy in Patent Office.)